United States Patent
Honert et al.

(10) Patent No.: US 9,458,060 B2
(45) Date of Patent: Oct. 4, 2016

(54) GRINDING AID FOR CEMENT CLINKER BASED ON POLYCARBOXYLATE ETHERS AND/OR LIGNOSULFONATES

(71) Applicant: SIKA TECHNOLOGY AG, Baar (CH)

(72) Inventors: Dieter Honert, Dielheim (DE); Thomas Heller, Meckesheim (DE); Thomas Müller, Heidelberg (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/440,788

(22) PCT Filed: Oct. 30, 2013

(86) PCT No.: PCT/EP2013/072698
§ 371 (c)(1),
(2) Date: May 5, 2015

(87) PCT Pub. No.: WO2014/067991
PCT Pub. Date: May 8, 2014

(65) Prior Publication Data
US 2015/0284291 A1 Oct. 8, 2015

(30) Foreign Application Priority Data
Nov. 5, 2012 (EP) .................... 12191242

(51) Int. Cl.
*C04B 24/18* (2006.01)
*C04B 28/02* (2006.01)
*C04B 7/52* (2006.01)
*C04B 16/04* (2006.01)
*C04B 24/04* (2006.01)
C04B 103/52 (2006.01)

(52) U.S. Cl.
CPC ................. *C04B 24/18* (2013.01); *C04B 7/52* (2013.01); *C04B 16/04* (2013.01); *C04B 24/045* (2013.01); *C04B 28/02* (2013.01); C04B 2103/52 (2013.01); Y02W 30/92 (2015.05)

(58) Field of Classification Search
CPC ......... C04B 24/18; C04B 24/26; C04B 7/52; C04B 16/04; C04B 18/08; C04B 24/045; C04B 24/2647; C04B 28/02; C04B 2103/52
See application file for complete search history.

(56) References Cited

U.S. PATENT DOCUMENTS

| 4,306,912 A * | 12/1981 | Forss ........................ C04B 7/12 106/707 |
| 2006/0272554 A1* | 12/2006 | Jardine .................... B02C 23/06 106/823 |
| 2012/0174831 A1* | 7/2012 | Hurley .................... C04B 28/02 106/808 |
| 2012/0214901 A1* | 8/2012 | Bury ........................ C04B 24/32 523/122 |
| 2014/0283711 A1* | 9/2014 | Guerra Barrena ...... C04B 28/04 106/708 |

FOREIGN PATENT DOCUMENTS

| CN | 1346812 A | 5/2002 |
| CN | 101318791 A | 12/2008 |
| CN | 102596846 A | 7/2012 |
| CN | 102639465 A | 8/2012 |
| DE | 202006007955 | * 9/2006 |
| EP | 1348729 A1 | 10/2003 |
| EP | 1138697 B1 | 11/2003 |
| EP | 1061089 B1 | 3/2004 |
| EP | 2298710 A1 | 3/2011 |
| EP | 2336100 A1 | 6/2011 |
| JP | 56-109852 A | * 8/1981 |
| WO | WO 2012/031762 A1 | * 3/2012 |
| WO | WO 2013/164212 A1 | * 11/2013 |
| WO | WO 2013/164213 A1 | * 11/2013 |

OTHER PUBLICATIONS

Derwent-Acc-No. 2009-J45116, abstract of Chinese Patent Specification No. CN 101428985 A (May 2009).*
Derwent-Acc-No. 2009-J47269, abstract of Chinese Patent Specification No. CN 101428981 A (May 2009).*
Derwent-Acc-No. 2009-K05953, abstract of Chinese Patent Specification No. CN 101434462 A (May 2009).*
Derwent-Acc-No. 2010-D19616, abstract of Chinese Patent Specification No. CN 101665339 A (Mar. 2010).*
Derwent-Acc-No. 2010-D19617, abstract of Chinese Patent Specification No. CN 101665338 A (Mar. 2010).*
Derwent-Acc-No. 2010-E58650, abstract of Chinese Patent Specification No. CN 101693605 A (Apr. 2010).*
Derwent-Acc-No. 2010-E78431, abstract of Chinese Patent Specification No. CN 101696096 A (Apr. 2010).*
Derwent-Acc-No. 2010-G29822, abstract of Chinese Patent Specification No. CN 101708972 A (May 2010).*
Derwent-Acc-No. 2010-JH37198, abstract of Chinese Patent Specification No. CN 101723614 A (Jun. 2010).*
Derwent-Acc-No. 2011-A31698, abstract of Chinese Patent Specification No. CN 101898878 A (Oct. 2010).*
Derwent-Acc-No. 2011-F17998, abstract of Chinese Patent Specification No. CN 102001842 A (Apr. 2011).*
Derwent-Acc-No. 2012-D66298, abstract of Chinese Patent Specification No. CN 102372454 A (Feb. 2012).*
Derwent-Acc-No. 2013-U42104, abstract of Chinese Patent Specification No. CN 102718429 A (Oct. 2012).*
Müller et al., "Mahlhilfsmittel auf PCE-Basis—eine vielversprechende Technologie," 17. Internationale Baustofftagung Ibausil, Sep. 23-26, 2009, pp. 87-95.
Heller et al., "Cement additives based on PCE," ZKG International, Bauverlag BV., Getersloh, DE, vol. 64, No. 2-2011, Feb. 1, 2011, pp. 40-48.
Dressel et al., "Modern grinding aids and their influence on the hydraulic properties of GBFS," ZKG International, Bauverlag BV., Getersloh, DE, vol. 63c1, No. 2-2011, Feb. 1, 2010, pp. 43-54.
May 14, 2015 International Preliminary Report on Patentability issued in International Application No. PCT/EP2013/072698.
May 23, 2016 Office Action issued in Chinese Patent Application No. 201380057005.1.

* cited by examiner

Primary Examiner — Anthony J Green
(74) Attorney, Agent, or Firm — Oliff PLC

(57) ABSTRACT

A description is provided of the use of an additive including polycarboxylate ether and/or lignosulfonate as grinding aid in cement grinding for producing a cement, especially when fly ash and rock flour are used in the cement. The additive is preferably an aqueous additive. The use of the grinding aid in the production of the cement leads to improved processability of concrete or mortar produced from the cement. In particular, improved stiffening behavior, a reduced water requirement, or a reduced superplasticizer requirement for the mortar or concrete is obtained.

13 Claims, No Drawings

GRINDING AID FOR CEMENT CLINKER BASED ON POLYCARBOXYLATE ETHERS AND/OR LIGNOSULFONATES

The invention relates to the use of an additive as grinding aid in the production of cement, to a method for producing cement using the grinding aid as well as to a cement obtained therefrom.

TECHNICAL FIELD

Cement is an inorganic, finely milled hydraulically acting binder for mortar and concrete. When water is added, the cement paste which forms cures by hydration to a water-resistant and volume-stable cement stone. For producing cement, cement raw materials are milled, so as to obtain a fine powder.

In cement grinding, it is known to add so-called grinding aids which can improve the grinding process. Grinding aids are also frequently referred to as grinding additives. Amines or glycols are frequently used as grinding aids. By using grinding aids it is possible, for example, to improve the energy utilization during the grinding or to accelerate the grinding process and thus increase the throughput. On the other hand, grinding aids in the cement can lead to a change or impairment of the usage properties of the cement when it is used for producing mortar or concrete.

Concrete additives are organic or inorganic additives for concrete or mortar, which influence the properties of concrete due to chemical and/or physical effects. For example, in the case of fresh concrete, the processability and the setting behavior can be controlled or improved with additives, but the solid concrete properties such as strength, impermeability, durability and freeze/thaw resistance can also be positively influenced by additives. Depending on the targeted properties, such additives are divided into concrete plasticizers (CL), superplasticizers (FA), retarders (R), accelerators (AC), air entraining agents (AEA), sealants (S), press-fit aids (PA), and stabilizers (ST). The concrete additives are in general added during the production of the mortar or of the concrete to the mixture made of cement, water, sand or gravel and optionally other additives.

Müller et al., 17. Internationale Baustofftagung ibausil [17$^{th}$ International Construction Materials Congress ibausil], Sep. 23-26, 2009, Meeting Reports Volume 1, Finger-Institut für Baustoffkunde, Weimar, D E, pp. 87-95, describes grinding aids based on polycarboxylate ethers for cement grinding.

Heller et al., ZKG International, Bauverlag B V., Getersloh, D E, Volume 64, No. 2-2011, pp. 40-48, describes polycarboxylate ethers as cement additives.

In Dressel et al., ZKG International, Bauverlag B V., Getersloh, D E, Volume 63cl, No. 2-2011, pp. 43-54, the mode of action of polycarboxylate ethers during the grinding of slag sand is examined.

EP 2298710 A1 describes the use of lignosulfonate-comprising additives for reducing the floating of carbon black on mineral binders. The additives can also comprise grinding aids selected from glycols, organic amines, ammonium salts of organic amines and carboxylic acids and polycarboxylate ether comb polymers.

EP 2336100 A1 describes additives for mineral binders with reduced browning potential, comprising a grinding aid selected from glycols, monocarboxylic acids having 1 to 4 C atoms and polycarboxylate ether comb polymers, as well as a retarder, which can be used in the cement clinker grinding process.

DESCRIPTION OF THE INVENTION

The problem of the invention is to provide a grinding aid for cement grinding, which at the same time also is associated with an improved processability of mortar or concrete formed from the cement, i.e., which also acts as an additive similarly to a concrete additive. In this manner, for example, the quantity of concrete additive required in the production of the mortar or concrete can be reduced. The addition of the additive can occur before the mill inlet, directly in the mill, or after the mill outlet, preferably occurring at the mill inlet.

Surprisingly, the problem is solved by using an additive comprising polycarboxylate ether and/or lignosulfonate as grinding aid in cement grinding for producing a cement, wherein the additive is preferably aqueous. Cement grinding is, in particular, a dry grinding process that is usually carried out in a mill. By the addition of the additive in the cement grinding, a higher efficiency is surprisingly achieved than by addition to the mortar or concrete mixture.

By using the additive as grinding additive, the properties of the cement and of mortar or concrete produced therefrom are improved, particularly when using fly ash and rock flour in the cement, so that the grinding additive also acts as a so-called improver. Surprisingly, it was found that, after the use of the cement additive, the cement has a clearly increased robustness with respect to natural variations in the cement quality, which have an effect on the properties in the fresh mortar or fresh concrete. Variations in the cement quality occur, for example, if, during ongoing production of a cement of type CEM II/B-V, the fly ash has to be replaced or if, during the production of a CEM II/B-LL, the quality of the added limestone varies. The invention is explained in further detail below.

The use of the grinding aid according to the invention surprisingly leads to an improved processability of mortar or concrete produced from the cement. By the addition of the additive comprising polycarboxylate ether and/or lignosulfonate as grinding aid, the desired property can surprisingly be influenced in a controlled manner, without thereby causing a negative effect. The water requirement can be lowered, so that the required quantity of superplasticizer for mortar or concrete can be clearly lower. The flow loss of the concrete or mortar is also clearly lower. The improvement of the stiffening behavior over the processing time allows a lower dosage of concrete additive. The additive, preferably the aqueous additive, comprising polycarboxylate ether and/or lignosulfonate, which is used according to the invention as grinding aid, in that regard also acts as a superplasticizer.

As grinding aid in cement grinding according to the invention, an additive comprising polycarboxylate ether and/or lignosulfonate is used. In principle, the additive can consist of only the overall active substance, i.e., polycarboxylate ether and/or lignosulfonate, and then it is usually in the form of a solid or powder. For this purpose, the compounds, grinding aids and/or additives listed below can optionally be added, without addition of water.

The additive comprising polycarboxylate ether and/or lignosulfonate is preferably an aqueous additive. For this purpose, polycarboxylate ether and/or lignosulfonate is/are dissolved, dispersed or suspended in water, so that an aqueous solution, dispersion or suspension is obtained. The additive is preferably an aqueous solution.

The additive can comprise polycarboxylate ether, lignosulfonate or a mixture of polycarboxylate ether and lignosulfonate. One or more polycarboxylate ethers and/or one or more lignosulfonates can also be used, which differ, for example, in molecular weight.

Polycarboxylate ethers and lignosulfonates are generally known to the person skilled in the art and are also commercially available. Below, examples of suitable and preferred embodiments for these compound classes are explained in further detail.

The polycarboxylate ether is, in particular, a comb polymer which has a polycarboxylate backbone and polyether side chains, wherein the polyether side chains are preferably bound via ester, ether and/or amide groups to the polycarboxylate backbone.

The comb polymer preferably comprises the following partial structural units or consists thereof:

a) a mole fractions of a partial structural unit S1 of formula (I)

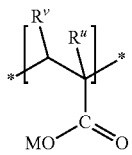
(I)

b) b mole fractions of a partial structural unit S2 of formula (II)

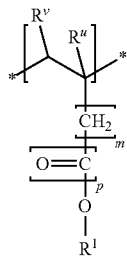
(II)

c) c mole fractions of a partial structural unit S3 of formula (III)

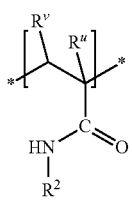
(III)

d) d mole fractions of a partial structural unit S4 of formula (IV)

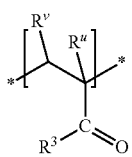
(IV)

where
M independently of one another represents $H^+$, an alkali metal ion, alkaline earth metal ion, a bivalent or trivalent metal ion, an ammonium ion or an organic ammonium group, each $R^u$ independently of one another stands for hydrogen or a methyl group, each $R^v$ independently of one another stands for hydrogen or COOM, m=0, 1 or 2, p=0 or 1, $R^1$ and $R^2$ independently of one another stand for a $C_1$ to $C_{20}$ alkyl group, cycloalkyl group, alkylaryl group or for -[AO]$_n$—$R^4$, where A=$C_2$ to $C_4$ alkylene, $R^4$ stands for H, a $C_1$ to $C_{20}$ alkyl group, cyclohexyl group or alkylaryl group, and n=2-250, $R^3$ independently of one another stand for $NH_2$, —$NR^5R^6$, —$OR^7NR^8R^9$, where $R^5$ and $R^6$ independently of one another stand for a $C_1$ to $C_{20}$ alkyl group, cycloalkyl group, alkylaryl group or aryl group, or stand for a hydroxyalkyl group or for an acetoxyethyl ($CH_3$—CO—O—$CH_2$—$CH_2$—) or a hydroxyisopropyl (HO—CH($CH_3$)—$CH_2$—) or an acetoxyisopropyl group ($CH_3$—CO—O—CH($CH_3$—$CH_2$—);

or $R^5$ and $R^6$ together form a ring of which the nitrogen is a part, in order to construct a morpholine or imidazoline ring;

$R^7$ is a $C_2$-$C_4$ alkylene group, $R^8$ and $R^9$ each represent independently of one another a $C_1$ to $C_{20}$ alkyl group, cycloalkyl group, alkyaryl group, aryl group or a hydroxyalkyl group, and where a, b, c and d represent mole fractions of the respective partial structural units S1, S2, S3 and S4, where a/b/c/d=(0.1-0.9)/(0.1-0.9)/(0-0.8)/(0-0.8), in particular a/b/c/d=(0.3-0.9)/(0.1-0.7)/(0-0.6)/(0-0.4), preferably a/b/c/d=(0.5-0.8)/(0.2-0.4)/(0.001-0.005)/0 and with the condition that a+b+c+d=1.

The sequence of the partial structural units S1, S2, S3 and S4 can be alternating, block-like or random. In principle it is also possible that, in addition to the partial structural units S1, S2, S3 and S4, additional structural units are present.

Preferably, the partial structural units S1, S2, S3, and S4 together amount to a weight proportion of at least 50% by weight, in particular at least 90% by weight, very particularly preferably at least 95% by weight, of the total weight of the comb polymer.

According to an additional advantageous embodiment, the comb polymer is, in particular, free of aromatic compounds and/or aromatic structural units.

A weight average molecular weight ($M_w$) of the comb polymer is in particular 5,000-150,000 g/mol, especially 10,000-100,000 g/mol.

The production of the comb polymers in itself is known to the person skilled in the art and can occur, for example, by radical polymerization of the corresponding monomers of formula ($I_m$), ($II_m$), ($III_m$) and ($IV_m$), which leads to a comb polymer KP with the partial structural units S1, S2, S3 and S4. The residues $R^u$, $R^v$, $R^1$, $R^2$, $R^3$, M, m and p are here defined as described above.

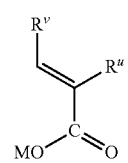
($I_m$)

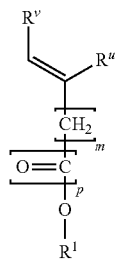
(II$_m$)

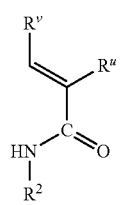
(III$_m$)

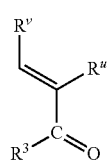
(IV$_m$)

It is also possible to produce the comb polymer by polymer-analogous transformation of a polycarboxylic acid of formula (V).

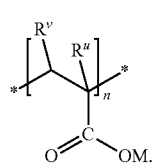
(V)

In the polymer-analogous transformation, the polycarboxylic acid of formula (V) is esterified or amidated with the corresponding alcohols or amines (for example, HO—R$^1$, H$_2$N—R$^2$, H—R$^3$), and then, if necessary, neutralized or partially neutralized (depending on the type of the residue M, for example, with metal hydroxides or ammonia). Details regarding the polymer-analogous transformation are disclosed, for example, in EP 1 138 697 B1 on page 7, line 20 to page 8, line 50, as well as in its examples, or in EP 1 061 089 B1 on page 4, line 54 to page 5, line 38 as well as in its examples. In a variation thereof, as described in EP 1 348 729 A1 on page 3 to page 5 as well as in its examples, the comb polymer can be produced in the solid aggregation state. The disclosure of these cited patents is included herewith in particular by reference. The production by polymer-analogous transformation is preferred.

Corresponding comb polymers are also commercially marketed by Sika Schweiz AG under the trade name series ViscoCrete®.

Very particularly suitable are comb polymers where
a) the residue R$^v$ stands for hydrogen,
b) the residue R$^u$ stands for a methyl group or for a mixture of a methyl group and hydrogen. In the latter case, a molar ratio of the methyl group to the hydrogen is, in particular, 25:75-75:25, in particular 40:60-60-40.
c) m=0,
d) p=1,
e) R$^1$, in each case independently of one another, stands for -[AO]$_n$—R$^4$ where n=20-70 and A=C$_2$ alkylene,
f) R$^2$, in each case independently of one another, stands for -[AO]$_n$—R$^4$, where A, in particular, stands for a mixture of C$_2$ and C$_3$ alkylene, R$_4$ advantageously represents a methyl group and in particular n=20-70. A weight average molecular weight of the group -[AO]$_n$—R$^4$ here is advantageously 1000-3000 g/mol. A molar ratio of the C$_2$ alkylene units to the C$_3$ alkylene units is in particular 25:75-75:25, in particular 40:60-60:40.
g) R$_4$ represents a methyl group and/or
h) a/b/c/d=(0.5-0.8)/(0.2-0.4)/(0.001-0.005)/0

Lignosulfonates can be obtained, for example, in particular on the basis of lignin-containing cellulose material, such as wood, fiber plants or recycled paper, for example. Lignin can be separated from the cellulose that is used, for example, for manufacturing paper ("pulping" method).

The lignin is chemically digested and sulfonated in order to make it water soluble, wherein lignosulfonates are obtained as crude product. Depending on the intended use, different methods can be carried out for cleanup or modification. An example of a modification reaction is a cation exchange reaction.

Depending on the degree of cleanup and the modification that has occurred, technical-grade lignosulfonates can optionally also contain proportions of inorganic substances, for example, inorganic salts, and/or organic substances, for example, sugar, acetic acid or furfurol, in different quantities. Such technical lignosulfonates that still contain foreign substances can also be used.

Lignosulfonates are polymers with a complex branched structure. Depending on the digestion conditions, they can have a varying content of sulfo-acid groups and a broad molecular weight distribution, for example, between 1,000 and 10$^5$. The weight average molecular weight can also vary in broad ranges. The lignosulfonates can have, for example, a weight average molecular weight (Mw) in the range from 5,000 to 20,000, preferably 8,000 to 20,000 g/mol. However, lignosulfonates with a higher or lower Mw are also suitable.

The polymer structure of the lignosulfonates is based substantially on the monomer units p-cumaryl alcohol, coniferyl alcohol, and sinapyl alcohol whose structural formulas are indicated below.

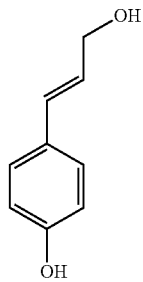

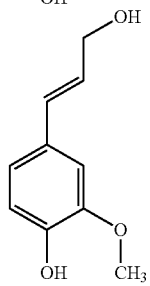

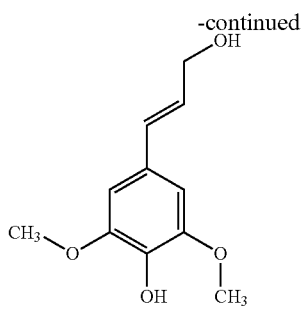

For illustration only, an example of a section of a possible polymer structure of lignosulfonates without counterion is represented schematically below, which is in no way intended to limit the invention.

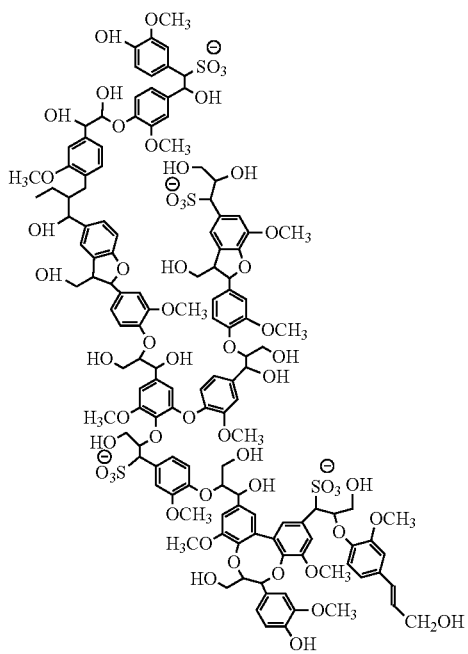

As counterions for the sulfonate group, all the usual ones known in the art are suitable. Examples of cations of lignosulfonates are sodium, ammonium, magnesium or calcium. The lignosulfonate can also contain different cations.

The amount of polycarboxylate ether and/or lignosulfonate together can vary in broad limits; however, it is, for example, suitably in the range from 10 to 80% by weight, preferably in the range from 20 to 60% by weight.

The quantity of additive or grinding aid used, relative to the cement, can also vary in a broad range and depends, for example, on the type of the raw materials to be milled. The quantity of grinding aid can be selected, for example, so that, in the cement produced, the quantity of polycarboxylate ether and/or lignosulfonate is in the range from 0.01 to 1.0% by weight, preferably in the range from 0.015 to 0.5% by weight, more preferably 0.05 to 0.35% by weight, relative to the total weight of the cement.

It is preferable that the additive comprises polycarboxylate ether and lignosulfonate, wherein the weight ratio of lignosulfonate to polycarboxylate ether can be selected in broad ranges. The weight ratio of lignosulfonate to polycarboxylate ether is preferably at least 1.1/1, is preferably in the range from 1.1/1 to 3/1, more preferably from 1.2/1 to 2.5/1, and particularly preferably from 1.3/1 to 2/1, wherein the additive is preferably used in a quantity such that the above-indicated quantity of polycarboxylate ether and lignosulfonate, relative to the total weight of the cement, is maintained.

The additive, preferably the aqueous additive, can moreover comprise one or more compounds selected from the group consisting of gluconates, polyacrylic acid, polymethacrylic acid or its salts, humic acids, α-hydroxycarboxylic acids, saccharides and polysaccharides. In a preferred embodiment, the aqueous additive contains one or more gluconates.

Preferred additives, in particular the aqueous additives, are those that contain polycarboxylate ether; polycarboxylate ether and lignosulfonate; polycarboxylate ether, lignosulfonate and gluconate; lignosulfonate; or lignosulfonate and gluconate.

The additive, preferably the aqueous additive, can moreover also comprise known grinding aids such as, for example, various amines or alkanolamines, for example, triethanolamine and triisopropanolamine, various glycols, for example, monoethylene glycol, diethylene glycol, propylene glycol or polypropylene glycol, and other surfactants.

Cements are composed of main constituents, usually additionally of small quantities of calcium sulfate (gypsum and/or hemihydrate and/or anhydrite) and optionally of secondary constituents and/or cement additives such as grinding aids. Main constituents are used in quantities of more than 5% by weight. The main constituents can be Portland cement clinker, also referred to as clinker, slag sand, natural or synthetic pozzolans, fly ash, for example, siliceous or calcareous fly ash, burnt shale, limestone and/or silica fume. As secondary constituent, the cements can contain up to 5% by weight of finely divided inorganic, mineral substances, which originate from the clinker production, for example, raw meal, or correspond to the other main constituents.

The cement, for the preparation of which the grinding aid used according to the invention is used, can be any conventional cement, for example, one in accordance with the five main cement types according to DIN EN 197-1: namely, Portland cement (CEM I), Portland composite cements (CEM II), blast-furnace cement (CEM III), pozzolan cement (CEM IV) and composite cement (CEM V). These main cement types are subdivided, depending on the amount added, into an additional 27 cement types, which are known to the person skilled in the art and listed in DIN EN 197-1. Naturally, all other cements that are produced according to another standard are also suitable, for example, according to ASTM standard or Indian standard. To the extent that reference is made here to cement types according to DIN standard, this naturally also relates to the corresponding cement compositions which are produced according to another cement standard.

A preferred cement comprises, for example, a mixture of at least one hydraulic powder and one or more powders selected from nonhydraulic, latent hydraulic and pozzolanic powders. The cement preferably comprises pozzolanic clinker substitutes, for example, fly ash such as anthracite fly ash or lignite fly ash, or nonhydraulic clinker substitutes such as limestone, for example.

It is particularly preferable if the cement comprises fly ash, such as anthracite fly ash or lignite fly ash, and/or rock flour. The cement is preferably a CEM II cement. Particularly preferable are the cements CEM II/B-V, CEM II/B-L, CEM II/B-LL and CEM II/B-M.

When using pozzolanic clinker substitutes such as fly ash or non-hydraulic clinker substitutes such as limestone in cement types that are used, for example, in the cement type CEM II B-M (V-LL) 42.5 N, the desired behavior with regard to water requirement, superplasticizer requirement and stiffening behavior over time, for example, could not be achieved. However, surprisingly the desired properties could be achieved with these cement types, if the grinding aid used according to the invention was used.

In the preparation of a cement, cement grinding occurs. The cement grinding is used in particular to form a reactive product from the clinker and optionally from the additional main constituents. For this purpose, the clinker alone, optionally jointly with secondary constituents (as a rule at most up to 5% by weight) or with additional main constituents, is finely milled. For the adjustment of the solidification, gypsum stone or a gypsum-anhydrite mixture is usually added to the milled product. In the case of joint grinding or fine grinding, the particle size distributions of the individual components cannot be influenced separately. For optimal cement production, separate grinding and subsequent mixing can therefore also be advisable, due to the different grindabilities of the cement raw materials.

In the method according to the invention for producing a cement, at least one or preferably all of the main cement constituents is/are milled in the presence of an additive comprising polycarboxylate ether and/or lignosulfonate, which is preferably an aqueous additive, as grinding aid, wherein the at least one main constituent preferably comprises the clinker. In a particularly preferred embodiment, the cement mixture to be milled comprises fly ash and/or rock flour. The cement grinding is in particular a dry grinding process. After the grinding, the cement is present in the form of a powder.

Secondary cement constituents, calcium sulfate and additional cement additives can be admixed before or after the grinding with the grinding aid, wherein they are preferably added before the grinding. To the extent that all the cement main constituents are not milled together in the presence of the grinding aid used according to the invention, the separately milled main cement constituents can be admixed later. Naturally, it is also possible to mill such separately milled main cement constituents likewise in the presence of the grinding aid used according to the invention.

The cement grinding usually occurs in mills, wherein ball mills, high pressure roll mills and vertical roll mills are preferable.

The suitable or preferred aqueous additives used in the method according to the invention and the suitable or preferred cement have already been described above. The cement and the additive, preferably the aqueous additive, can contain additives conventionally used in the field of cement and concrete additives. Examples are surfactants, dispersants, crosslinking agents, thickeners, organic solvents, cosolvents, defoamers, carboxylic acids, preservatives and stabilizers.

By means of the method according to the invention, a cement is obtained in which the grinding aid comprising a polycarboxylate ether and/or a lignosulfonate in the cement produced leads to an improved processability of the concrete or mortar produced from the cement. In particular, an improved stiffening behavior, a reduced water requirement and/or a reduced superplasticizer requirement is/are obtained in the mortar or concrete produced from the cement.

EXAMPLES

Below, several examples are listed, which further illustrate the invention but are not intended in any way to limit the scope of the invention. Unless otherwise indicated, all the contents and percentages pertain to the weight.

Cement Composition:

|  | Cement 1 | Cement 2 |
| --- | --- | --- |
| Clinker | 65.0% | 65.0% |
| Sulfate carrier | 5.0% | 5.0% |
| Fly ash 1 | 30.0% | — |
| Fly ash 2 | — | 30.0% |

Composition of the Constituents:

|  | Clinker |
| --- | --- |
| LOI 950° C. | 0.13% |
| $SiO_2$ | 20.5% |
| $Al_2O_3$ | 6.01% |
| $TiO_2$ | 0.26% |
| MnO | 0.04% |
| $Fe_2O_3$ | 3.91% |
| CaO | 64.5% |
| MgO | 1.74% |
| $K_2O$ | 1.31% |
| $Na_2O$ | 0.22% |
| $SO_3$ | 1.04% |
| $P_2O_5$ | 0.14% |

|  | Fly ash 1 | Fly ash 2 |
| --- | --- | --- |
| LOI 1050° C. | 2.26% | 4.67% |
| $SiO_2$ | 51.0% | 50.1% |
| $Al_2O_3$ | 24.1% | 26.9% |
| $TiO_2$ | 0.99% | 1.52% |
| MnO | 0.11% | 0.05% |
| $Fe_2O_3$ | 9.71% | 4.74% |
| CaO | 5.31% | 7.11% |
| MgO | 2.02% | 1.68% |
| $K_2O$ | 3.03% | 0.81% |
| $Na_2O$ | 0.49% | 0.19% |
| $SO_3$ | 0.59% | 0.42% |
| $P_2O_5$ | 0.13% | 1.32% |

Grinding of the Cements
Laboratory ball mill TTS 100
Grinding of in each case 20 kg cement
Temperature in mill: 100° C.
Fineness of the cements: Blaine: 4100 $cm^2/g \pm 100$ $cm^2/g$
Sieve residue (32 μm sieve): 9.5%±1.0%

|  | Grinding 1 Cement 1 | Grinding 2 Cement 1 | Grinding 3 Cement 1 | Grinding 4 Cement 2 | Grinding 5 Cement 2 | Grinding 6 Cement 2 |
| --- | --- | --- | --- | --- | --- | --- |
| Grinding time | 60 min | 53 min | 55 min | 60 min | 54 min | 54 min |
| Cement additive | — | ZA 1 | ZA 2 | — | ZA 1 | ZA 3 |

Added quantity of the cement additives: 0.1%-0.3%

| Composition in % | ZA 1 | ZA 2 | ZA 3 |
| --- | --- | --- | --- |
| Polycarboxylate ether* type 1 (aqueous solution) | 30 |  | 15 |
| Polycarboxylate ether* type 2 (aqueous solution) |  | 20 | 10 |
| Lignosulfonate* (aqueous solution) | 40 | 40 | 35 |

-continued

| Composition in % | ZA 1 | ZA 2 | ZA 3 |
|---|---|---|---|
| Defoamer | 0.5 | 0.5 | 0.5 |
| Water | 29.5 | 39.5 | 39.5 |

*are also used in the formulation of concrete additive products of the company Sika In order to achieve the target fineness, a shorter grinding time is needed for grindings 2, 3, 5, and 6 than for grinding 1 and grinding 4. This means that the grinding efficiency is increased by the added products.

Determination of the Superplasticizer Requirement of the Cements Based on Mortar and Consistency Curve To a predetermined mortar composition, during the mixing process, a sufficient amount of superplasticizer is added so that a previously defined slump flow (target: 250 mm±5 mm) is achieved. This slump flow is referred to as "5 min slump flow" and is indicated in mm. The dosage of superplasticizer required to reach the slump flow is referred to as the superplasticizer requirement and is indicated in % by weight of cement. The consistency curve is determined by measuring the slump flow again after 30, 60 and 90 min.

As superplasticizer, a standard superplasticizer of the company Sika was used.

|  |  | Grinding 1 | Grinding 2 | Grinding 3 |
|---|---|---|---|---|
| Superplasticizer requirement |  | 0.62% | 0.42% | 0.41% |
| Slump flow | 5 min | 253 mm | 249 mm | 251 mm |
|  | 30 min | 214 mm | 226 mm | 233 mm |
|  | 60 min | 198 mm | 221 mm | 215 mm |
|  | 90 min | 183 mm | 220 mm | 207 mm |

|  |  | Grinding 4 | Grinding 5 | Grinding 6 |
|---|---|---|---|---|
| Superplasticizer requirement |  | 0.79% | 0.45% | 0.53% |
| Slump flow | 5 min | 250 mm | 252 mm | 251 mm |
|  | 30 min | 229 mm | 232 mm | 221 mm |
|  | 60 min | 211 mm | 224 mm | 214 mm |
|  | 90 min | 192 mm | 218 mm | 210 mm |

By addition of the cement additives, it was possible not only to reduce the superplasticizer requirement. Surprisingly, the consistency curve was also improved simultaneously.

The invention claimed is:

1. An additive as a grinding aid for producing a cement, the additive comprising polycarboxylate ether and lignosulfonate, wherein
    the additive is an aqueous additive,
    the weight ratio of lignosulfonate to polycarboxylate ether is at least 1.1/1, and
    the polycarboxylate ether and lignosulfonate content in the aqueous additive is in the range of from 10 to 80% by weight.

2. The additive according to claim 1, wherein the additive further comprises one or more compounds selected from the group consisting of gluconates, polyacrylic acid, salts of polyacrylic acid, polymethacrylic acid, salts of polymethacrylic acid, humic acids, α-hydroxycarboxylic acids, saccharides and polysaccharides.

3. The additive according to claim 1, wherein the additive comprises one or more gluconates.

4. The additive according to claim 1, wherein the additive further comprises one or more compounds selected from the group consisting of amines, alkanolamines, glycols and surfactants.

5. A cement comprising:
    the additive of claim 1;
    at least one hydraulic powder; and
    one or more powders selected from nonhydraulic, latent hydraulic, and/or pozzolanic powder.

6. The cement according to claim 5, wherein the cement comprises a pozzolanic powder or a nonhydraulic powder.

7. The cement according to claim 5, wherein the cement is a cement type CEM II according to DIN EN 197-1.

8. The cement according to claim 5, wherein the cement comprises fly ash and/or rock flour.

9. A concrete or mortar produced from the cement according to claim 5, wherein the concrete or mortar has a higher stiffening behavior, a reduced water requirement, a reduced superplasticizer requirement, and/or an increased robustness of fresh mortar or fresh concrete properties compared to a concrete or mortar produced from a same cement that does not comprise the additive.

10. A method for producing a cement, wherein the method comprises:
    milling an additive comprising polycarboxylate ether and lignosulfonate in a mill with at least one main cement constituent or all of the main cement constituents, wherein
    the additive is an aqueous additive,
    the weight ratio of lignosulfonate to polycarboxylate ether is at least 1.1/1, and
    the polycarboxylate ether and lignosulfonate content in the aqueous additive is in the range of from 10 to 80% by weight.

11. The method according to claim 10, wherein the method further comprises, before or after the milling, admixing a secondary cement constituent, calcium sulfate and/or cement additives.

12. The method according to claim 10, wherein the milling is a dry grinding process.

13. A cement obtained by the method according to claim 10.

* * * * *